Aug. 5, 1924.
J. F. DREES
1,504,031
AUTOMOBILE RECORDING INSTRUMENT
Filed Aug. 17, 1921    2 Sheets-Sheet 1
Fig.1.
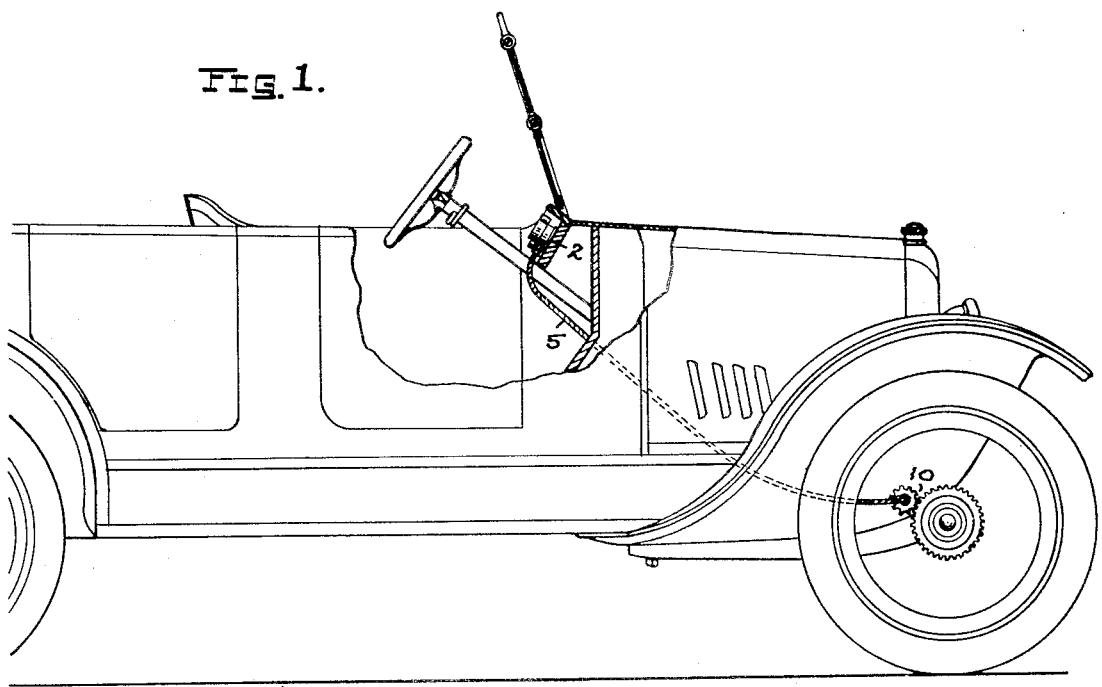
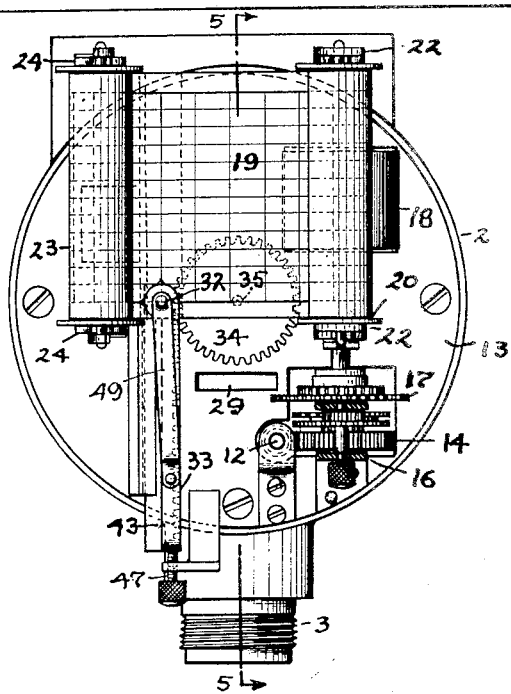
Fig.3.
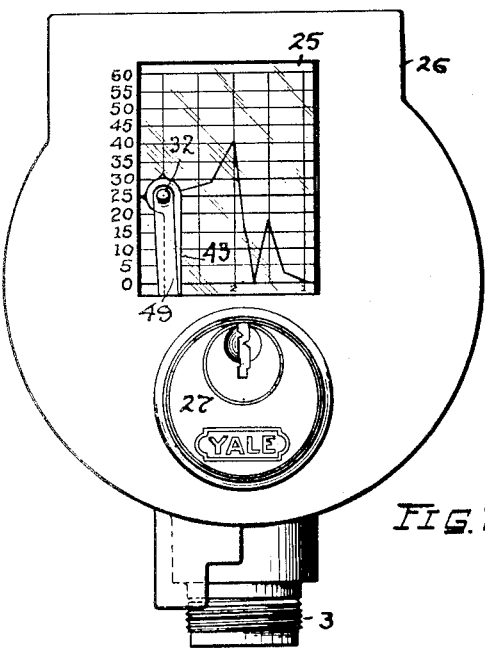
Fig.2.
Inventor
John F. Drees
By Fisher & Moser
Attorney Aug. 5, 1924.
J. F. DREES
1,504,031
AUTOMOBILE RECORDING INSTRUMENT
Filed Aug. 17, 1921   2 Sheets-Sheet 2
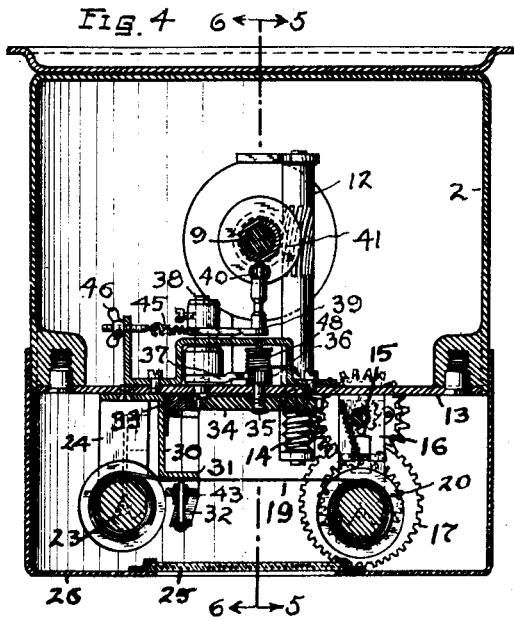
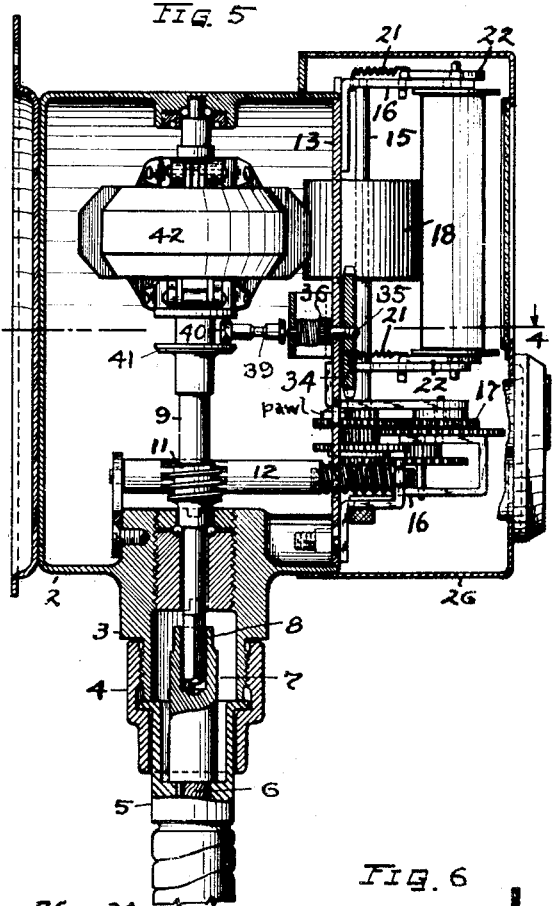
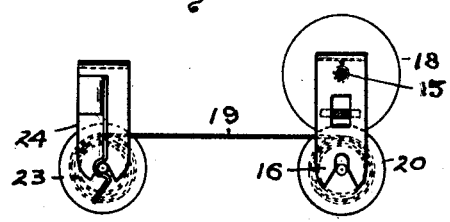
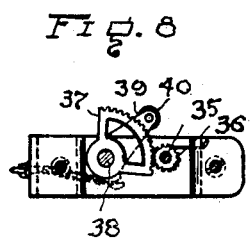
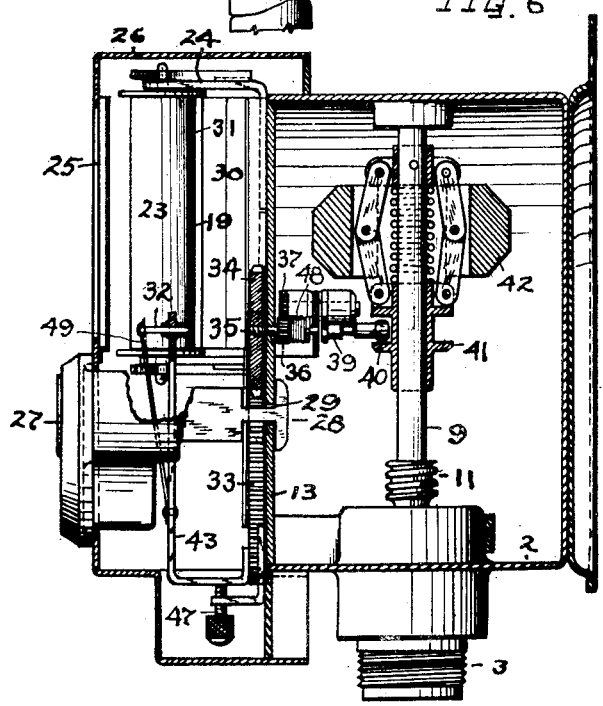
By JOHN F. DREES
Fisher & Moser   Attorney Patented Aug. 5, 1924.

1,504,031

UNITED STATES PATENT OFFICE.

JOHN F. DREES, OF CLEVELAND, OHIO.

AUTOMOBILE RECORDING INSTRUMENT.

Application filed August 17, 1921. Serial No. 493,065.

*To all whom it may concern:*

Be it known that I, JOHN F. DREES, a citizen of the United States, residing at Cleveland, in the county of Cuyahoga and State of Ohio, have invented certain new and useful Improvements in an Automobile Recording Instrument, of which the following is a specification.

The present invention pertains to recording instruments, and consists of an appliance primarily designed to record the speed and distance of travel of an automobile. As constructed the device is relatively small and compact and permits the use of recording strips in the form of rolls, and these rolls are supported and driven in a way particularly adapted to facilitate their removal and replacement from the device as mounted upon the instrument board of the automobile where the recording operation is at all times visible to the driver of the machine. The device is also equipped with a suitable lock to prevent tampering and unauthorized access to the recording strip or roll, thereby permitting an authentic record to be made of the distance traveled by the vehicle and the speed of the vehicle within given distances, and the recording roll or strip may be used for single trips, for an entire day's run, or for a series of trips in a day or week, thus permitting a check to be had on the driver's operations over any given course or trip, or for a predetermined period of time.

In the drawings accompanying this application, Fig. 1 is a side view of an automobile showing my improved instrument mounted on the instrument board or dash of the vehicle. Fig. 2 is an enlarged front or face view of the instrument, and Fig. 3 is a view of the instrument with the cover removed to show the recording roll and mechanism. Fig. 4 is a horizontal section on line 4—4 of Fig. 5, looking down on the operating parts, and Fig 5 is a vertical section of the instrument on line 5—5, of Figs. 3 and 4, looking toward the right. Fig. 5 is a vertical section of the instrument on line 5—5 of Fig. 4 looking toward the left. Fig. 7 is a plan view of the spools and feed roller and their supporting brackets. Fig. 8 is a front view of the segment gear and pinion which is operated by the crank arm connective with the governor.

The invention comprises a round casing 2 having a screw-threaded boss 3 at its bottom side adapted to be engaged by the coupling member 4 of a flexible conduit or tube 5. A flexible shaft 6 in this tube has a drive member 7 which connects with the angular extension 8 of a centrifugal governor shaft 9 supported vertically on ball bearings within casing 2. Shaft 6 may be driven by gearing 10 connected to the front wheel of the vehicle, or it may be operated by gears driven from the power transmission mechanism of the vehicle, so that the governor-shaft 9 will rotate at a speed proportional to the speed of travel of the vehicle over the road. A worm pinion 11 on shaft 9 transmits this rotation and movement to a transverse worm shaft 12 mounted within the lower or base end of casing 2, said worm shaft extending forwardly and projecting through and beyond a base plate 13 affixed by screws at the front side of casing 2. The outer end of worm shaft 12 is provided with a spiral screw-thread or worm which is in permanent mesh with a gear 14 loosely mounted upon the lower end of a vertical feed shaft 15 revolubly supported at its opposite ends upon brackets 16—16 at the front side of face plate 13. Gear 14 operates a train of gear and ratchet mechanism 17 which reduces the speed of rotation of shaft 15 and serves to drive said shaft only in one direction at all times. A rubber wheel or rubber covered roller 18 affixed to said shaft 15 serves to feed a strip of paper 19 transversely across the front of face plate 13 as shaft 15 revolves, while winding said strip at the same time upon a wooden receiving roller or spool 20 placed vertically in front of and in pressing engagement with rubber roller 18. Briefly, roller 18 transmits its rotative movement to spool 20 to feed and wind the paper strip 19 upon the spool, and a pair of coiled springs 21 connect with the slidable plates 22 which support the trunnion ends of spool 20 and maintain a constant working contact between the paper and its spool and roller 18 while permitting the paper to wind itself in successive folds upon the spool. The trunnions at the opposite ends of spool 20 slide in open-ended slots in bracket 16 and are removable therefrom so that the roller may be easily detached when the recording strip has been fully wound thereon.

Paper strip 19 is fed from a roller or spool 23 removably mounted in slotted brackets 24 at the front side of plate 13 parallel with receiving spool 20, and in operation the strip of paper is stretched taut opposite a window 25 at the front side of a relatively deep cover 26 having slip engagement with casing 2. A Yale lock 27 having a T shaped locking extension 28 is adapted to extend through a horizontal slot 29 in plate 13 to lock cover 26 in place. An arm 30 on bracket 24 has a vertical flat face 31 across which the strip of paper 19 is adapted to travel when drawn forward by the revolution of spool 20 under the action of feed roller 18, and a recording stylus or pencil 32 is arranged to move in a vertical line in front of the strip of paper and its backing plate 31 coincidently with the horizontal feed movement of the strip.

The degree of movement of said stylus or pencil upwardly and downwardly is proportional to the speed of travel of the automobile and to bring about that result the stylus or pencil is removably secured at the upper end of a rack bar 33 which is free to slide vertically upon plate 13 in mesh with a gear 34 affixed to the outer end of a short shaft 35 extending through plate 13 and having a pinion 36 thereon which is adapted to be operated by a segmental gear 37 affixed to an oscillatory shaft 38 having a crank arm 39 with a roller 40 at its free end operating or riding within a channeled collar 41 on governor shaft 9. Collar 41 is linked to the centrifugal governor members 42 and is free to slide longitudinally on shaft 9 as said governor members are rotated and moved inwardly or outwardly in varying degree under varying speed, thereby oscillating shaft 38 through crank arm 39 and raising and lowering the rack bar and the stylus together, the stylus moving vertically across the face of the paper strip and behind the window adjacent a vertical scale of numerals, beginning at 0 and ending at 60. The stylus is mounted on an arm 43 affixed to rack 33 and a pointer at the upper end of this arm opposite the vertical row of numerals indicates the speed of travel of the vehicle to the operator of the machine, while the stylus or pencil marks the paper strip as said paper strip is fed horizontally. The marking of the strip is therefore on lines which are either inclined vertically or are scribed horizontally depending upon whether the vehicle is traveling at an increasing or decreasing speed, or at a constant speed, and if the change of speed is rapid the vertical lines will be inclined acutely to the vertical lines printed on the sheet or strip of paper. Straight vertical lines are also printed on the strip of paper at uniformly spaced intervals to represent the distance traveled by the vehicle in miles or fractions of miles, and the printed horizontal lines on the strip of paper represent the speed of travel of the vehicle from 0 to 60 miles per hour beginning from the bottom horizontal line and moving upwardly.

A coiled spring 45 is connected to crank arm 39 and to an adjusting screw 46 to return rack 33 to a normal position and to take up lost play, and a coiled spring 48 on oscillatory shaft 35 also takes up lost play. A set screw 47 provides a stop rest for rack 33 and the stylus arm, see Fig. 6, and a flat spring 49 on arm 43 bears against the stylus or marking pencil 32 to feed it inward as it wears.

In operation the rotation of flexible shaft 6 slides a collar 41 longitudinally on shaft 9, thereby oscillating shaft 38 thru crank arm 39. This reciprocates the rack bar and the stylus vertically across the face of the paper strip. During this interval the paper strip is being wound and unwound upon the respective spools and is traveling at a constant or variable speed proportionate to the speed of the vehicle, the power to rotate the winding spool being transmitted through roller 18 and the train of speed reduction gears which are operated by the worm pinion 11 on shaft 9. Consequently the line inscribed by the stylus will cross or follow the checkered lines on the strip and indicate and record the speed and distance of travel of the vehicle.

What I claim is:

1. An instrument adapted to record the speed and distance of travel of an automobile, comprising a casing having a revoluble shaft therein and a centrifugal governor mounted upon said shaft, a pair of spools mounted axially parallel with the governor shaft and a recording strip removably mounted at the front side of said casing, a feed roller axially parallel with said spool shaft engaged with said strip and one of said spools having a speed-reducing gear connection with said governor shaft, a stylus movable vertically across the line of travel of said strip having rack and gear and oscillatory operating connections with said governor, and a cover for said casing having a window and a mileage scale opposite said strip.

2. An instrument adapted to record the speed and distance of travel of an automobile, comprising a casing having a vertical power transmitting shaft therein carrying a centrifugal governor having a sliding collar, a front plate for said casing having brackets, a pair of vertical shafts having spools and a recording strip between said spools mounted removably upon said brackets in front of said plate, a feed roller adapted to engage said strip opposite one of said spools, a train of speed-reducing gears for said feed roller in worm gear connection with said shaft, and a vertically-movable stylus opposite said strip having a rack and oscillatory gear and a crank arm connection with said slidable collar.

3. An instrument adapted to record the speed and distance of travel of an automobile, comprising a casing having a vertical shaft carrying a centrifugal governor, a flexible power transmitting shaft detachably connected with said governor shaft, a train of speed reducing gears operated by said governor shaft, a vertical feed roller operated by said gears, a recording strip and spool mounted in resilient frictional engagement with said feed roller, a stylus adapted to be reciprocated vertically opposite said strip having rack and gear and oscillatory crank arm connections with said governor, a mileage scale opposite said stylus, and said recording strip having spaced indicating lines thereon.

JOHN F. DREES.